(12) United States Patent
Kitamura

(10) Patent No.: US 7,159,072 B2
(45) Date of Patent: Jan. 2, 2007

(54) METHOD AND APPARATUS FOR MONITORING THE QUANTITY OF DIFFERENTIAL DATA IN A STORAGE SYSTEM

(75) Inventor: Manabu Kitamura, Cupertino, CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/089,689

(22) Filed: Mar. 24, 2005

(65) Prior Publication Data
US 2006/0218364 A1 Sep. 28, 2006

(51) Int. Cl.
*G06F 12/00* (2006.01)
(52) U.S. Cl. .................... 711/112; 711/111
(58) Field of Classification Search ............... None
See application file for complete search history.

(56) References Cited

U.S. PATENT DOCUMENTS

| 5,649,152 A | 7/1997 | Ohran et al. |
| 6,092,066 A | 7/2000 | Ofek |
| 6,584,551 B1 | 6/2003 | Huber |
| 2003/0101321 A1 | 5/2003 | Ohran |
| 2003/0167380 A1 | 9/2003 | Green et al. |
| 2005/0086432 A1 | 4/2005 | Sakai |
| 2005/0172092 A1* | 8/2005 | Lam et al. .................. 711/161 |
| 2006/0085608 A1* | 4/2006 | Saika .......................... 711/162 |

* cited by examiner

*Primary Examiner*—Reginald Bragdon
*Assistant Examiner*—Horace L. Flournoy
(74) *Attorney, Agent, or Firm*—Townsend and Townsend and Crew LLP

(57) ABSTRACT

Copy-on-write snapshot processing is performed on a storage system in order to produce snapshots of one or more logical volumes in the storage system. The write I/O operations made to the storage system are observed for a certain period of time. Based on the observations an estimate of the size of the storage space required to preserve the snapshot data can be computed. The information can be used to provide sufficient storage space for the snapshot process.

26 Claims, 11 Drawing Sheets

```
% showP preservation disk
                capacity - 100 GB
                utilization -  8.1 GB
                consumption rate - 0.2 GB / hour

```
% showP  p-disk1 preservation disk (1)
                capacity - 100 GB
                utilization -  8.1 GB
                consumption rate - 0.2 GB / hour

** ALERT **
preservation disk is at 95% capacity

| Time1 | Time2 | BLOCKS |
|---|---|---|
| 1/21/2004 0:00 | 1/21/2004 3:00 | 400 |
| 1/21/2004 1:00 | 1/21/2004 3:00 | 200 |
| 1/21/2004 2:00 | 1/21/2004 3:00 | 143 |
| | | |

Fig. 15

| BLOCK | FLAG | LOCATION |
|---|---|---|
| 0 | 0 | |
| 1 | 1 | 0 |
| 2 | 1 | 1024 |
| 3 | 0 | |
| ⋮ | ⋮ | |
| N | 0 | |

Fig. 16

METHOD AND APPARATUS FOR MONITORING THE QUANTITY OF DIFFERENTIAL DATA IN A STORAGE SYSTEM

BACKGROUND OF THE INVENTION

The invention is related to storage systems and in particular to snapshot methods in storage systems.

A method for creating a snapshot volume (the volume where the data image at a certain point-in-time is preserved) is frequently used in many storage systems, since the snapshot enables users to backup data on a live system concurrently when host I/O is online. Generally, there are two methods for taking snapshots:

Mirroring method: In this method, the storage system physically creates a mirror of the volume (primary volume, production volume) which constitutes the snapshot. The snapshot is created on a secondary volume (snapshot volume). When the user instructs the storage system to stop mirroring, a point-in-time image of the data in the primary volume is preserved in the secondary volume. An example of this method is disclosed in U.S. Pat. No. 6,092,066 and is incorporated herein by reference in its entirety.

Copy-on-write method: In the mirroring method described above, users have to use a secondary volume having the same size as the primary volume to store the snapshot. This doubles the storage cost for maintaining snapshots. In the copy-on-write method, the storage system does not mirror all of the data that is stored on the primary volume. Instead, when updates occur to a region in the primary storage systems, the storage system copies the data in the region (hereinafter it is called "differential data") to a preservation memory area (e.g., magnetic disks, semiconductor memory, or others). Thus, the data is written to both the primary volume and to the preservation memory area. In this method, the amount of preservation memory area usually is much less than the size of the primary volume since only updated regions in the primary volume are duplicated and it is rare that all of the primary volume would be re-written between snapshot volumes. U.S. Pat. No. 5,649,152 discloses the copy-on-write snapshot method and is incorporated herein by reference in its entirety.

SUMMARY OF THE INVENTION

The invention provides a method and system to estimate how much preservation memory area is needed when copy-on-write snapshots are taken. The amount of preservation memory area that is needed to store the differential data depends on the access locality of the primary volume. When many regions in the primary volume are updated, much preservation memory area will be consumed to provide the snapshot image. If the amount of differential data exceeds the size of the preservation memory area, the preservation memory area cannot provide a suitable snapshot. An information system according to the present invention comprises a storage system and a host computer. The host computer includes one or a plurality of application programs and an I/O activity monitor. The I/O activity monitor basically determines the rate at which storage in the preservation memory area is consumed for one or more snapshot volumes of one or more primary volumes. I/O activity information is collected and based on the such statistics, the I/O activity monitor can estimate the amount of differential data that is generated in the storage system. The I/O activity monitor can reside in the host system or in the storage system.

BRIEF DESCRIPTION OF THE DRAWINGS

Aspects, advantages and novel features of the present invention will become apparent from the following description of the invention presented in conjunction with the accompanying drawings, wherein:

FIGS. 13A–13C show illustrative interfaces;

FIG. 15 shows an illustrative table for tracking multiple snapshots;

FIG. 16 shows a snapshot bitmap; and

DESCRIPTION OF THE SPECIFIC EMBODIMENTS

$1^{ST}$ Embodiment

Figure 1:
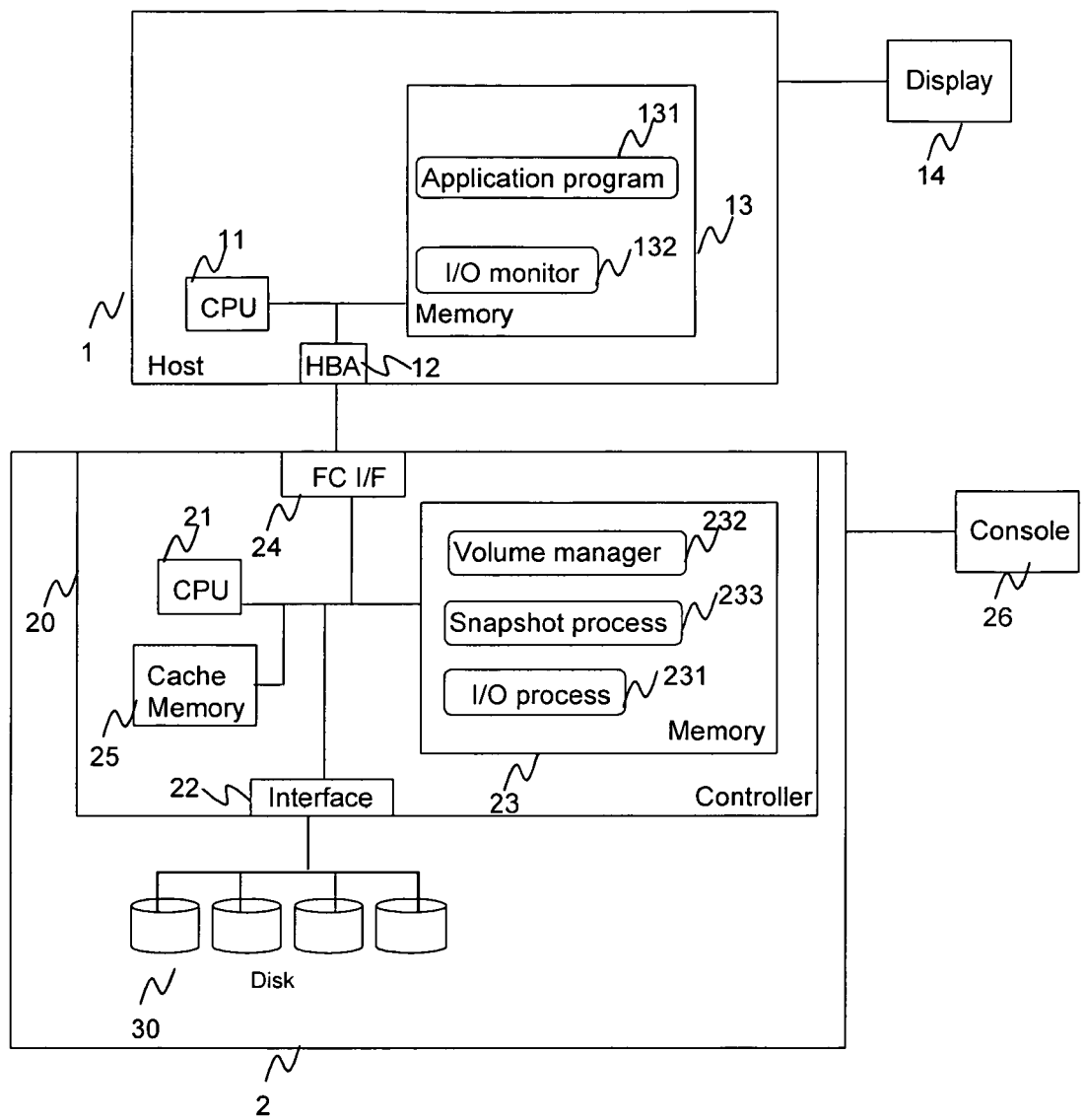
FIG. 1 is a block diagram showing a configuration of a computer system to which a first embodiment of the present invention is applied.

FIG. 1 shows an example of the information system in which the method of the present invention can be applied. A Host 1 comprises a CPU 11 to provide the general data processing capability of a host computer, such as execution of various computer executable programs. A host bus adapter (HBA) 12 provides a suitable interface for connection to a storage component. A memory 13 typically includes random access memory (RAM) for volatile memory storage. A display 14 allows a user to interact with the host computer. Additional components not shown are understood to be included, such as a keyboard, mouse, and other suitable input devices.

A storage system 2 comprises a disk controller 20 and a disk subsystem 30 which comprises a plurality disks (physical storage devices). The disk controller 20 comprises a CPU 21 to provide the disk controller functionality. A backend interface 22 connects to the disk subsystem 30. Programs comprising the disk controller functions can be stored in and executed from a memory 23. A Fibre Channel interface (FC/IF) 24 provides a suitable interface for a connection to the host computer 1. A cache memory 25 can be provided to enhance the I/O performance of the storage system 2 to service read and write operations sent from the host computer 1 by serving as a high-speed intermediate storage for data read from disks in the disk subsystem 30 and for data to be written to disks in the disk subsystem 30. The cache memory 25 might include a battery backup in case of power disruption. A console 26 is typically provided to the storage system 2 via a suitable connection such as an Ethernet cable. The console is used to configure the storage system. In the case of the present invention, the console can be used to manage snapshots; e.g., create, delete, archive, etc.

The storage system 2 defines one or more logical volumes from the physical storage devices of the disk subsystem 30; e.g. RAID volumes can be defined from plural disks in the disk subsystem 30. Host computers such as the host computer 1 issue I/O requests to the logical devices during the course of operations performed on the host. For example, a database application might perform data read or data write operations to a logical device defined by the storage system 2. Furthermore, in accordance with the present invention, the storage system provides snapshot processing, and in particular copy-on-write snapshot capability.

Among the processes which operate in the disk controller 20, there are: An I/O process 231 which processes host I/O requests received by the storage system 2 from the host 1. I/O requests include data read requests and data write requests. A volume manager process 232 performs the operations to create and manage one or more logical volumes from among the disks of the disk subsystem 30. A snapshot process 233 performs the operations to create and manage snapshot volumes. The snapshot process 233 also handles I/O requests directed to a snapshot volume. These processes typically are implemented in executable program code. The code (or portions of the code in the case of a virtual memory managed architecture) are stored in the memory 23 and executed by the CPU 21.

The host computer 1 typically executes one or more application programs 131. These programs, among other operations, perform I/O request operations with the storage system 2. In accordance with the present invention, the host computer 1 also executes an I/O monitor program (process) 132. As will be discussed in more detail, the I/O monitor 132 collects information about the I/O activity in the logical volumes from which a determination can be made whether there is sufficient space to perform snapshot processing of a logical volume. These programs (or portions of the programs in the case of virtual memory managed architecture) are stored in the memory 13 and are executed by the CPU 11.

Figure 2:
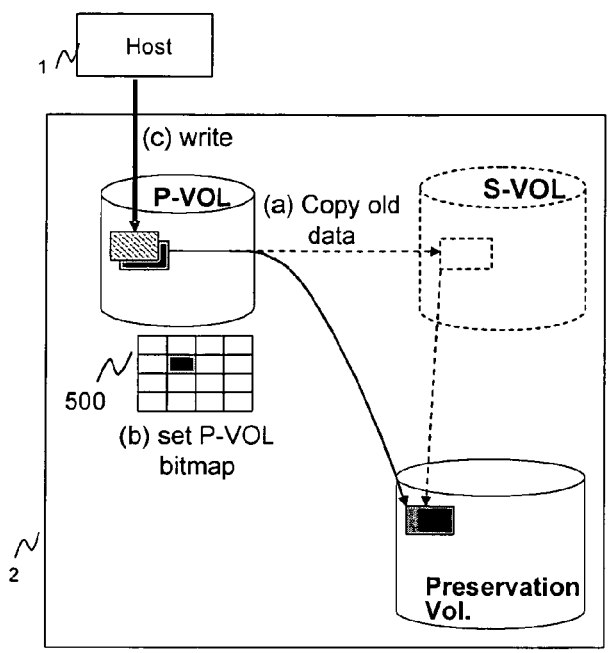
FIG. 2 shows the data flow for copy-on-write snapshot processing.
Figure 3:
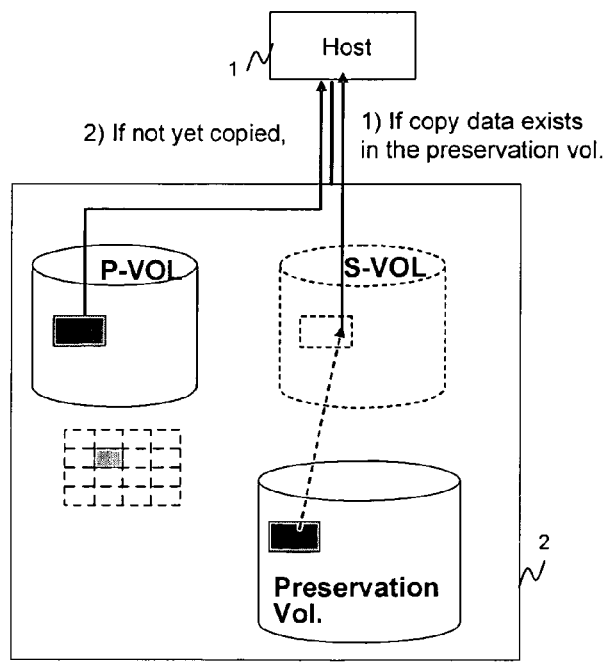
FIG. 3 shows how a snapshot is read in a copy-on-write snapshot.

Referring now to FIG. 2 and FIG. 3, a brief discussion of copy-on-write snapshot processing is given. The copy-on-write snapshot process (hereinafter referred to as the "snapshot function") creates a virtual snapshot volume (designated as S-VOL) of a point-in-time snapshot of a selected logical volume (designated as P-VOL). As will be seen, the snapshot volume comprises portions of the logical volume and portions of a preservation volume.

The selected logical volume for which a virtual snapshot volume is to be created is referred to as the primary volume (P-VOL). A user (typically a system administrative type user) will identify a logical volume and instruct the storage system 2 to create (via the snapshot process 233) a snapshot volume to create a point-in-time snapshot of the selected logical volume. In particular, the snapshot process 233 will create a virtual snapshot volume (S-VOL). Many such virtual snapshot volumes (called "snapshot generations") can be created for a given logical volume. Thus, one or more snapshot generations can be created for a logical volume. Thus, if seven snapshot volumes are defined for a P-VOL, it is said that the P-VOL has "seven snapshot generations."

A preservation volume is used by the snapshot process 233 and along with a logical volume constitute the virtual snapshot volume for that logical volume. As will become clear, the preservation volume stores changes (difference data) made to the logical volume for which snapshot processing is being performed. The preservation volume can itself be a logical volume that is created and managed by the volume manager 232. Two or more preservation volumes can be maintained in the storage system 2. The storage capacity of the preservation volume need not be the same a logical volume for which a snapshot is being taken.

FIG. 2 shows that a logical volume has been selected for snapshot processing, and is designated as P-VOL. The virtual snapshot volume is identified as S-VOL. When the host computer 1 issues a write request to the selected logical volume at a time subsequent to initiation of snapshot processing, the snapshot process 233 handles the write request in the following manner:

If the LBA (logical block address) or LBA's that are the target of the write request have been "marked" (see next step), then the write request is serviced in the P-VOL. The data associated with the write request is written to the locations in the logical volume (P-VOL) identified by the LBA(s).

If the target LBA(s) have not been "marked", then the data that currently is stored in the LBA(s) of the logical volume (P-VOL) is copied to a suitable location in the preservation volume. The data that is currently stored in the LBA(s) of the P-VOL does not need to be stored in the same LBA(s) in the preservation volume as the one in the P-VOL. This is designated by data movement (a) in FIG. 2. This operation preserves the state of the data (in the P-VOL) that is about to be overwritten when the write request is serviced. The target LBA(s) which have been copied are designated as "marked". This is shown as (b) in FIG. 2. The data that is stored in the preservation volume preserves a snapshot of that portion of the P-VOL that is about to be overwritten when the write request is serviced. It is understood of course, that there is a suitable mapping mechanism to map data that is stored in the preservation volume to this original location in the P-VOL. The data in the preservation volume is referred to as "differential data" for that snapshot.

The snapshot process 233 can use a snapshot bitmap 5000 (FIG. 16) to identify blocks in the P-VOL which are "marked" and the location (LBA) 5003 in the preservation volume where data from P-VOL is stored. The snapshot process usually manages a bitmap (e.g., bitmap 500' in FIG. 16) other than the bitmap (e.g., bitmap 500 in FIG. 4) used by the I/O monitor 132. In addition to the bit 5001, the bitmap 500' maintains the data location 5003 where snapshot data is preserved in the preservation volume. In the present embodiment, the location information 5003 is represented as LBA. It is also possible that the location 5003 is represented as BLOCK address. For example, each bit in the bitmap can represent one or more blocks in the P-VOL. Each such bit is initially set to "0" (i.e., not marked) to indicate the data in the corresponding block has not been copied to the preservation volume. When a data block is copied in the manner explained above, the corresponding bit is set to "1" (i.e., "marked"). The blocks whose corresponding bits are set to "1" can be referred to as "snapshot blocks", indicating that snapshots of those blocks have been taken. In a high capacity storage system, the logical volume might comprise a very high number of blocks; e.g. 128 kiloblocks ($2^{17}$ blocks). Maintaining a bitmap having 128 kilobits may not be practical. However, if each bit represents a unit of storage in the preservation volume that is equal to 128 blocks of the logical volume, for example, then the resulting 1 kilobit bitmap may be more manageable. In that case, copying of data to the preservation volume occurs in 128 block chunks; each "snapshot block" in the preservation volume then constitutes 128 blocks of the logical volume.

FIG. 3 shows how data from a virtual snapshot volume (S-VOL) can be retrieved, thus allowing for data access to a point-in-time snapshot of the logical volume (P-VOL). When the host computer 1 issues a data read request to the virtual snapshot volume, the snapshot process 233 performs the following:

The storage system 2 receives a data read request targeted at the virtual snapshot volume. The snapshot process 233 determines a target read address from address information contained in the data read request.

If the target read address is "marked" (per inspection of the bitmap), then the data is read from the preservation volume, using the target read address (that is stored in the Location 5003 in the snapshot bitmap 5000) to identify the location of the data on the preservation volume.

If the target read address is not marked, then the P-VOL is accessed using the target read address.

The data that is read, either from the preservation volume or the P-VOL, is then sent back to the host computer 1.

It can be seen then that the "virtual snapshot volume" comprises portions of the P-VOL itself and the preservation volume.

As mentioned above, the creation and management of the virtual snapshot volume(s) can be administered from the console 26. Alternatively, suitable programs can be provided in the host computer 1 and the storage system 2 to allow a user at the host computer 1 to create and manage virtual snapshot volumes.

The preservation volume can be a single device or comprise multiple physical storage devices. A preservation volume can store data for snapshot volumes for more than one logical volume.

In accordance with the present invention, an I/O monitor such as the I/O monitor 132 shown in FIG. 1, monitors the activity of snapshot blocks in order to ascertain or estimate usage of the preservation volume. More specifically, a rate of consumption of storage space on the preservation volume is determined. The following data tables and process operations detail an embodiment of this aspect of the present invention.

Figures 4, 5, 6:
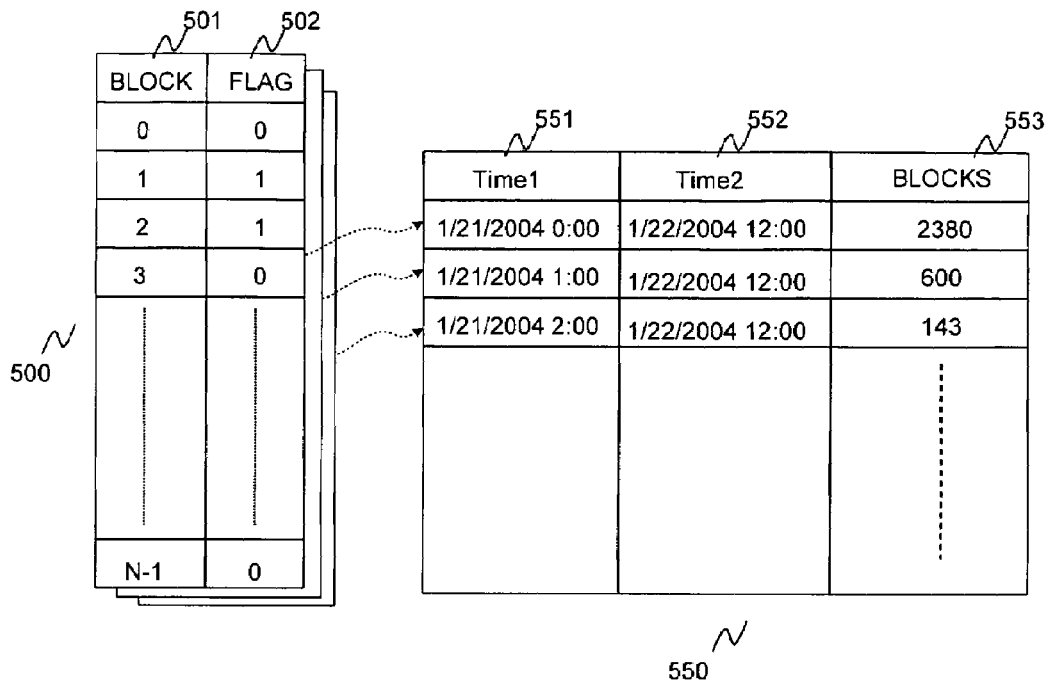
FIG. 4 is an illustrative bitmap for tracking preserved blocks.
FIG. 5 is an illustrative table for tracking multiple snapshots.
FIG. 6 shows user-settable information for a logical volume.

FIG. 6 illustrates, in tabular form, information 600 provided by a user relating to the selection of logical volumes for snapshot processing. The information is used by the I/O monitor 132. Each row in the table corresponds to a logical volume for which snapshot processing is to be performed.

A Port WWN field 601 and a LUN field 602 store information which identify the logical volume (P-VOL) for which snapshot processing is to be performed. The Port WWN field indicates the world wide name of the logical device, and the LUN field indicates the logical unit number of the logical volume.

A BLOCK size field 603 indicates the size of the snapshot block; i.e., the minimum (or unit) amount of data that is copied to the preservation volume. Recall from the discussion above that for practical reasons, the snapshot block might be larger than the block size of the logical volume. In this particular embodiment, the values stored in the BLOCK size field are in units of "numbers of blocks"; e.g., a value of 128 means that one snapshot block (which is copied to the preservation volume) is equal to 128 blocks of data from the logical volume. Thus, if the block size on the logical volume is 512 bytes, then the snapshot block is 64 kilobytes (64 KB).

A NUMBER field 604 represents the number of snapshots to be taken for a logical volume. An INTERVAL field 605 indicates the how often a snapshot is to be taken. Thus, for example, in the second row 606 the logical volume is scheduled for 36 snapshots, where one snapshot is taken every hour. After 36 snapshot generations have been collected (over a 35 our period), then the first snapshot is deleted when processing for the $37^{th}$ snapshot begins, the second snapshot is deleted when the $38^{th}$ snapshot is taken, and so on. In other words, the system will maintain 36 generations of snapshots for this logical volume. As another example, in the fourth row 607, only one snapshot is maintained for that logical volume. Moreover, a snapshot is taken every hour.

FIG. 4 illustrates information in the form of a bitmap referred to as an I/O activity bitmap 500 (as compared to the snapshot bitmap 500' of FIG. 16) relating to I/O activity in the logical volume for which snapshot processing is being performed. The bitmap 500 is also maintained by the I/O monitor 132. One such bitmap is provided for each snapshot generation. For example, the information in FIG. 6 indicates at least 51 snapshot generations will eventually be created (7+36+7+1) thus creating 51 corresponding bitmaps. The I/O monitor 132 updates the information in the bitmaps.

The bitmap 500 keeps track of each snapshot block for its associated snapshot generation. The information tracks whether or not the snapshot block has been written to by the host computer 1 since the time that snapshot process began. If a snapshot block had been written to, then that means the original data in the snapshot block had been copied to the preservation volume.

A FLAG field 502 indicates whether the corresponding snapshot block has been updated by a write operation since the onset of snapshot processing. This field simply indicates whether or not a write operation occurred. Consequently, the value is binary; i.e., "0" (OFF) or "1" (ON).

A BLOCK field 501 stores the snapshot block number. Recall that a snapshot block might be more than one block of the logical volume. For example, referring to the fourth row 607 in FIG. 6, the virtual snapshot volume comprises snapshot blocks consisting of 64 blocks of the logical volume. Thus, snapshot block number 0 stores data for LBAs 0–63 of the logical volume, snapshot block number 1 stores data from LBAs 64–127 of the logical volume, and so on. A method for computing the snapshot block number that corresponds to the target LBA of the I/O operation is to perform a division of the LBA by the value in the BLOCK size field 603 and ignoring any remainder from the division operation. For example, if the target LBA is block 133, then the corresponding snapshot block number is: 133÷64 (drop the remainder)=2.

As an implementation note, since snapshot block numbers range from 0–(N−1), the values stored in the BLOCK field 501 are indices into the bitmap. The ith entry in the bitmap would correspond to snapshot block number i. Therefore, the position in the bitmap corresponds to the snapshot block number, and a separate field 501 for storing the snapshot block number would not be needed.

FIG. 5 shows, in the form of a block number table 550, information for each logical volume for which snapshot processing is being performed. The information relates to a rate at which data is copied from a logical volume to a preservation volume in connection with a snapshot generation. Each row in the table represents information for a snapshot generation. A BLOCKS field 553 indicates a number of snapshot blocks that were copied during a period of time. A Time1 field 551 indicates the beginning time of the period, and a Time2 field 552 indicates the end time of the period. The values for the BLOCKS field 553 can be determined by summing the "ON" bits in the bitmap 500 of the corresponding snapshot generation.

Figure 7:
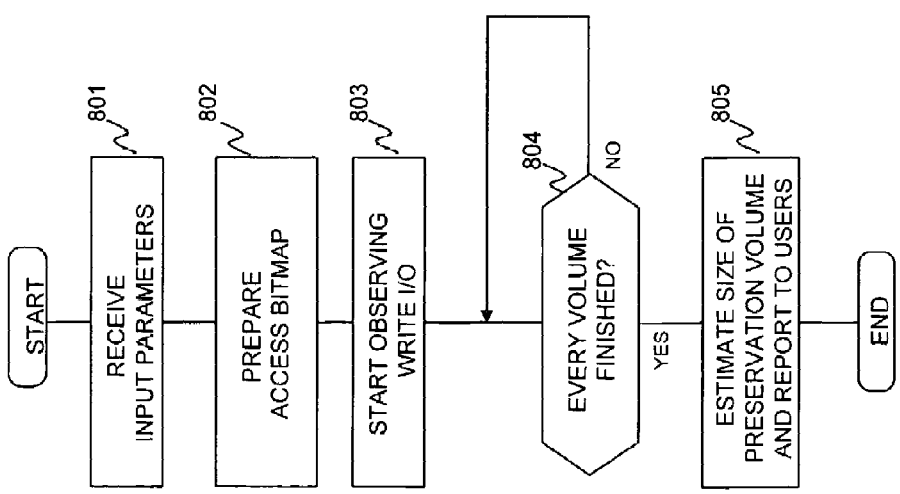
FIG. 7 shows the process flow for the I/O monitor.

FIG. 7 shows operation of the I/O monitor 132. As discussed earlier, the I/O monitor 132 monitors I/O operations issued from the host computer 1 to the logical volume (s) for which users want to take snapshots. The collected information is used to ascertain (or predict) whether there will be enough space in the preservation volume(s) for storing snapshot blocks.

Thus, in a Step 801, the I/O monitor 132 receives the input parameters from a user. The input parameters are stored in information 600, and include Port WWN 601 and LUN 602 of the P-VOL, BLOCK size 603, Number 604, and Interval 605 of each P-VOL. A suitable interface can be readily provided to enter the data; e.g., a graphical user interface (GUI) or command line interface (CLI). This step serves to initialize the information shown in FIG. 6.

In a Step 802, one or more bitmaps 500 are created based on the information obtained from Step 801. Monitoring of I/O operations then begins, Step 803. The monitoring is performed in parallel with every logical volume for which users want to take snapshots. Details of this step are provided in FIG. 8.

In a Step 804, a check is made whether every I/O monitoring process that begins at step 803 finishes. For example, if the user specified taking 7 snapshots (field 604, FIG. 6) every 24 hours (field 605), then the monitoring is stopped after 168 hours (24×7 hours). The monitoring step at step 803 stops after every monitoring process in every logical volume is finished.

In a step 805, the number of snapshot blocks that have been written from the logical volume for which a snapshot is being taken is determined. This information can then be used to obtain an indication of the space that is being consumed in the preservation volume, or an estimated rate at which space in the preservation volume is being consumed, or other similar kinds of information that can give the administrator an idea of whether the present storage capacity of the preservation volume is adequate. The number of snapshot blocks can be computed by summing the number of ON bits in the corresponding bitmap 500. In a more general case, more than one logical volume may be the subject of snapshot processing, in which case there will be more than one bitmap. The number of snapshot blocks would then be computed by summing all the ON bits in all of the appropriate bitmaps.

This computed number is an indication of the amount of space being consumed in the preservation volume. Using the time information in FIG. 5, it is possible to compute a rate of consumption of storage space in the preservation volume. This information can then be presented to a user via a suitable interface. In addition, any overhead needed in the preservation volume to manage the stored data can be included in the computation.

Referring for a moment to FIGS. 13A–13C, various illustrative displays are shown. In FIG. 13A, a user can be provided with a command that shows the particulars for a preservation volume. In the example shown in FIG. 13A, the user uses a command line interface (CLI) to issue a "showP" command to show information about the preservation disk. FIG. 13B is a variant where an argument can be provided with the "showP" command to specify a preservation volume among many preservation volumes. FIG. 13C shows a display in which the system issues a warning when the storage capacity of the preservation volume has exceeded a predetermined threshold. Such messages usually are displayed to a system console 14.

Figure 8:
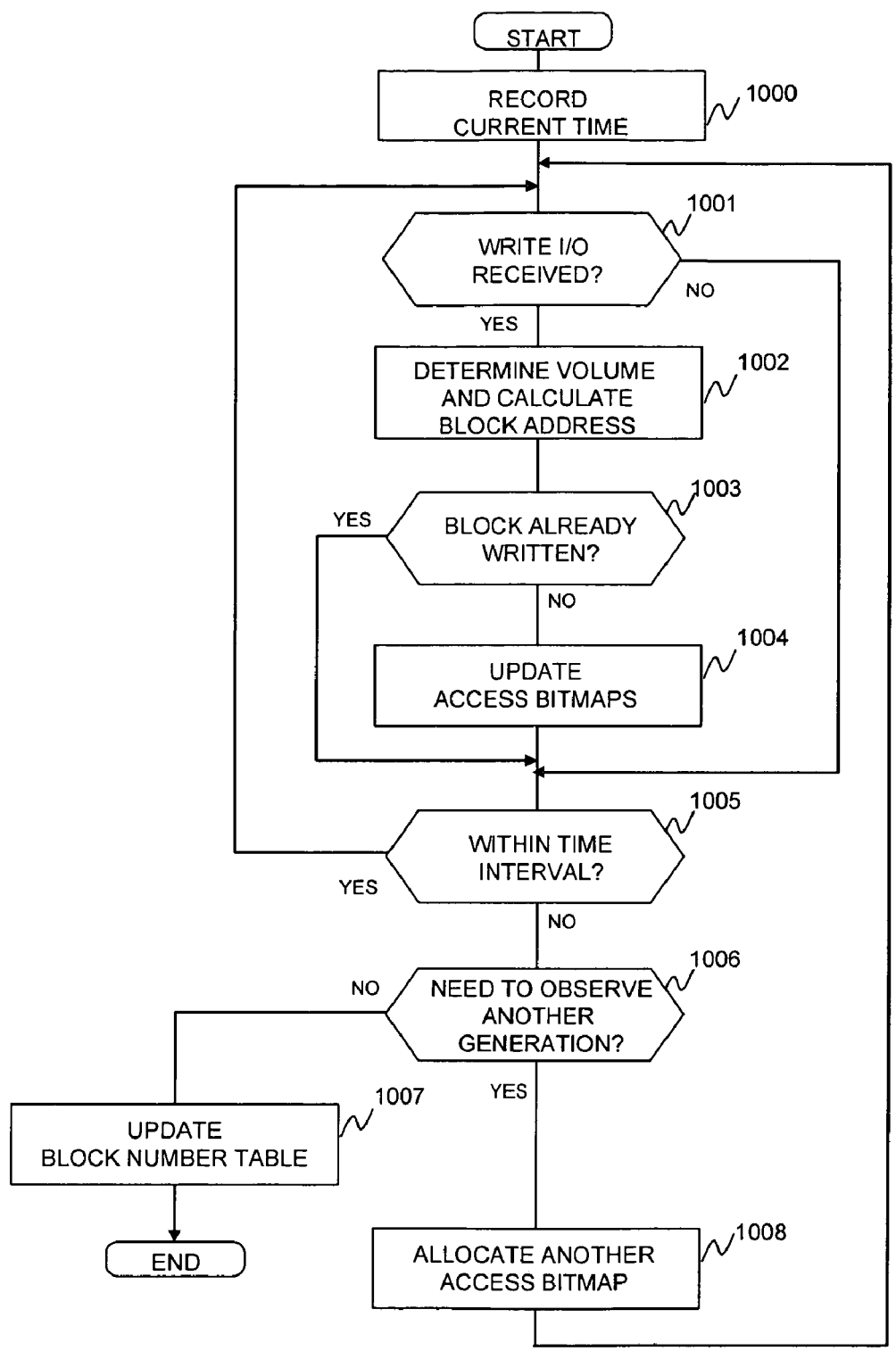
FIG. 8 shows a detailed process flow for the observing step shown in FIG. 7.

Referring now to FIG. 8, additional details of the monitoring Step 803 (FIG. 7) will be given. The monitoring is performed for each logical volume for which users want to take snapshots. In a typical operating system environment, each instance of monitoring executes as a separate process in parallel (hereinafter referred to as a "write observing process").

At the beginning of the write observing process, various operations (Step 1000) to initialize data and so on are performed. For example, the Time1 field 551 in the appropriate row in the table 550 can be initialized with the start time. Recall that each row in table 550 corresponds to a snapshot generation. Thus, the write observing process is provided with information that indicates the table entry that corresponds to that process.

In a Step 1001, the write observing process begins monitoring I/O in the host computer 1. When the host computer issues a write operation, the processing proceeds to a Step 1002; otherwise processing proceeds to a Step 1005.

In Step 1002, the target logical volume associated with the write operation is identified. This serves to identify the bitmap 500 that corresponds to the logical volume. The target location in the logical volume is identified from the write operation; i.e., the LBA(s) of the block(s) to which the data is to be written is identified. The logical volume LBA is converted to its corresponding snapshot block number as discussed above. For example, if the Port WWN 601 of the write request is 10:04:e2:04:48:39 and the LUN 602 is 0, then the BLOCK size 603 is determined from table 600 to be 64 KB. That is, 64*1024/512=128 SCSI disk blocks. If the LBA in the write request is 364, then the snapshot block number is 364÷128 (drop remainder)=2. The BLOCK field 501 of the bitmap 500 can then be searched for "2", the computed snapshot block number, to obtain the corresponding entry in the bitmap. As mentioned above, the snapshot block number can serve as an index into the bitmap 500.

In a Step 1003, the write observing process checks the I/O activity bitmaps 500 of the corresponding volume that is detected by Step 1002 to determine whether the BLOCK address that was calculated has already been written by a previous write I/O request. This is accomplished by checking the FLAGs 502 of the corresponding BLOCK address calculated at step 1002. Since more than one I/O activity bitmap 500 is prepared when multiple generations of snapshot volumes are being tracked, the I/O activity bitmap for each generation needs to be checked; it is possible that the bit in more than one bitmap must be set (see discussion of FIG. 14 below). If the block had been updated, then the process proceeds to step 1005. If the block had not been previously updated, then the process proceeds to step 1004 to update the I/O activity bitmap(s) 500.

In a Step 1004, the blocks in the P-VOL that correspond to the snapshot block are copied to the preservation volume. The corresponding bit entry(ies) in the bitmap(s) are also set to indicate the block(s) in the P-VOL have been copied.

In a Step 1005, the write observing process checks if the current time is within the time interval 605 by comparing the current time and Time1 field 551 of the most recent generation of snapshot volume (e.g. the last row in the block number table 550). If the current time is within the time interval 605, the process goes back to step 1001. If it is not, the process proceeds to step 1006.

In a Step 1006, the write observing process determines if it should create another snapshot generation. For example, 36 snapshots are made from the volume whose Port WWN 601 and LUN 602 are 10:04:e2:04:48:39 and 2 respectively (second row 606 in the input parameter information 600). In this case, the write observing process must observe the write activities 36 times (that is, until the 36 rows of information are stored in the block number table 550, the write observing process continues to observe the write I/Os). If it needs to observe another generation's write activity, the process proceeds to step 1008. If does not, then the process goes to step 1007.

In a Step 1007, the write observing process updates the block number table 550 of the corresponding volume. It inputs the current time in the Time2 field 552, counts the number of updated snapshot blocks in the I/O activity bitmap 500, and inputs the number of updated snapshot blocks in the BLOCKS 553 field.

In a Step 1008, the write observing process adds one row in the block number table 550 which is used for recording the number of updated blocks for the next generation snapshot volume, records the current time in the Time1 field 551 in the added row, and allocates another I/O activity bitmap 500 for the next generation snapshot volume. This sets up the information for another snapshot generation.

Figure 14:
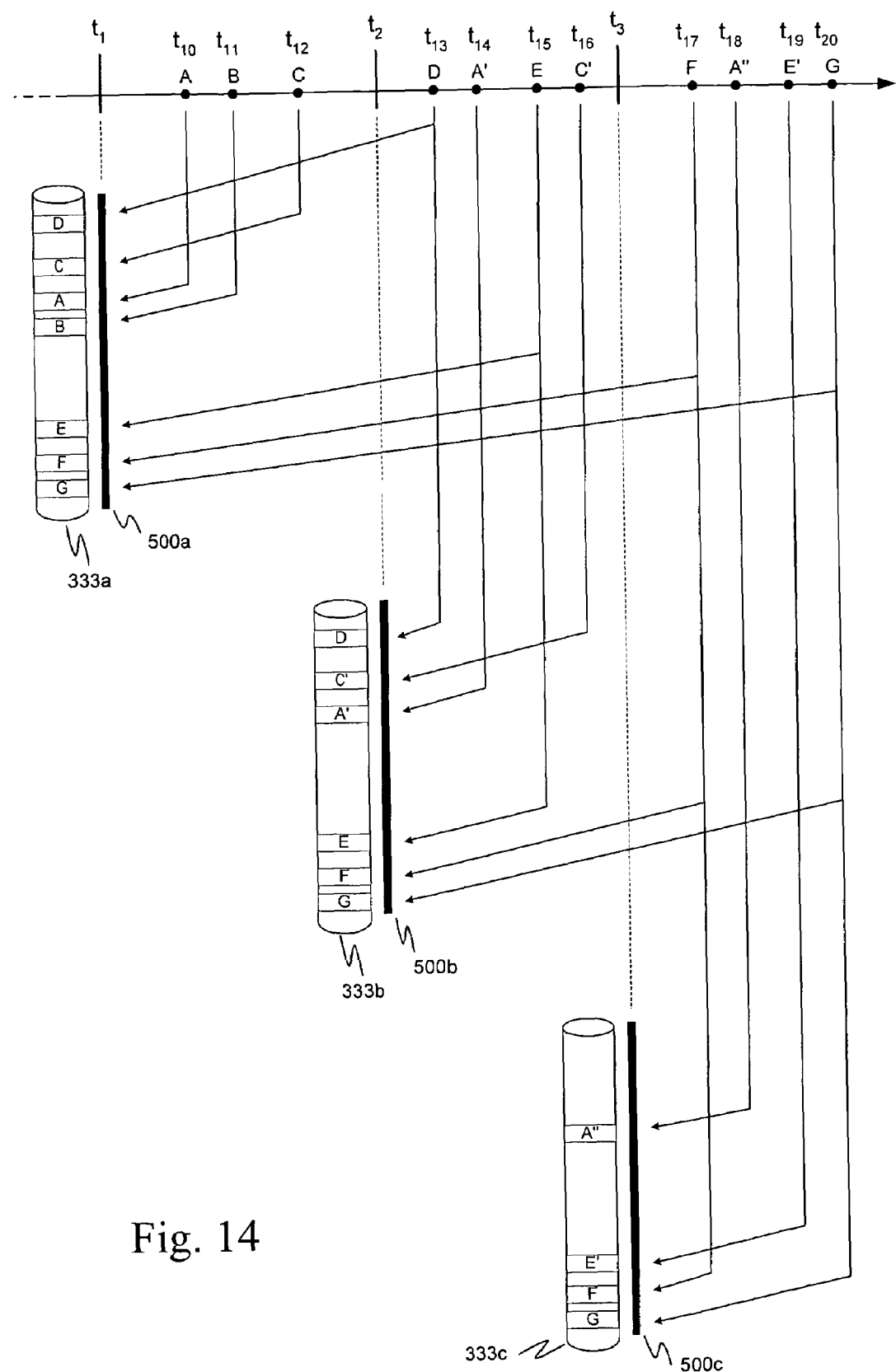
FIG. 14 illustrates an example of multiple snapshot processing.

Refer for a moment to FIG. 14 for an illustration of the process described in FIG. 8. A timeline shows times $t_1$, $t_2$, and $t_3$. At a time prior to $t_1$ write requests made to a logical volume are simply serviced by performing the write operation on the logical volume. At time $t_1$, suppose a command to perform snapshot processing of the logical volume (P-VOL) issues. Subsequent to time $t_1$, blocks in P-VOL identified by letters A–G are shown on the timeline indicating times of modification of the blocks. Consider the first snapshot generation. The information that represents the first snapshot generation includes preservation volume 333a and bitmap 500a that are managed by the snapshot process 233. Write requests to blocks A, B, and C are indicated on the timeline. Per Steps 1001–1004 of FIG. 8, the blocks A, B, and C are stored to the preservation volume 333a before being overwritten when the write requests are serviced. The bitmap entries that correspond to blocks A, B, and C in bitmap 500a are set; e.g., to "1".

At time $t_2$, another snapshot generation is initiated. Now there are two snapshots being tracked. The information that represents the second snapshot generation includes preservation volume 333b and bitmap 500b that are managed by the snapshot process 233. A write request to block D is received. Per Step 1004 in FIG. 8, the corresponding bitmaps for each snapshot is inspected. For both snapshot generations block D had not been previously modified. Consequently, the block D is copied to preservation volume 333a and to preservation volume 333b before it is overwritten by the write request. Similarly, the corresponding entries in the bitmaps 500a and 500b are set to "1". It is noted here that the preservation volumes 333a and 333b can be separate storage devices or different areas on a common logical device.

At time $t_{14}$, block A is written again, identified now by A'. Since, block A was previously modified (or stated differently, already preserved) in the first snapshot, block A' will not be preserved again in preservation volume 333a. However, block A' will be preserved on preservation volume 333b.

At time $t_{15}$, block E is written. For both snapshot generations block E had not been previously modified (and thus not already preserved in either snapshot generation). Consequently, the block E is copied to preservation volume 333a and to preservation volume 333b. Similarly, the corresponding entries in the bitmaps 500a and 500b are set to "1".

At time $t_3$, another snapshot generation is initiated. Now there are three snapshots being tracked. The information that represents the third snapshot generation includes preservation volume 333c and bitmap 500c that are managed by the snapshot process 233. Block F is then modified. For all three snapshot generations block F had not been previously modified. Consequently, the block F is copied to preservation volume 333a, to preservation volume 333b, and to preservation volume 333c. Similarly, the corresponding entries in the bitmaps 500a, 500b, and 500c are set to "1".

At time $t_{18}$, block A is written again, identified now by A". Since, block A was previously modified (or stated differently, already preserved) in the first snapshot and in the second snapshot, block A" will not be preserved again in preservation volumes 333a or 333b. However, block A" will be preserved on preservation volume 333c.

In the implementation of the snapshot process 233 described above, when a plurality of snapshots are taken, the content of the block to be updated is stored to a preservation volume corresponding to the snapshot. Thus, if two snapshots are taken, then two data blocks are copied, each one to a preservation volume corresponding to one of the two snapshots; i.e., two preservation volumes. In accordance with another implementation, a block to be updated when multiple snapshots are being taken can be stored only once in the preservation volume, and suitable pointer or other referencing data structure can be used to by the snapshot volumes to point to the single copy of the preserved data block, thus saving space for the preservation volume.

Figure 17:
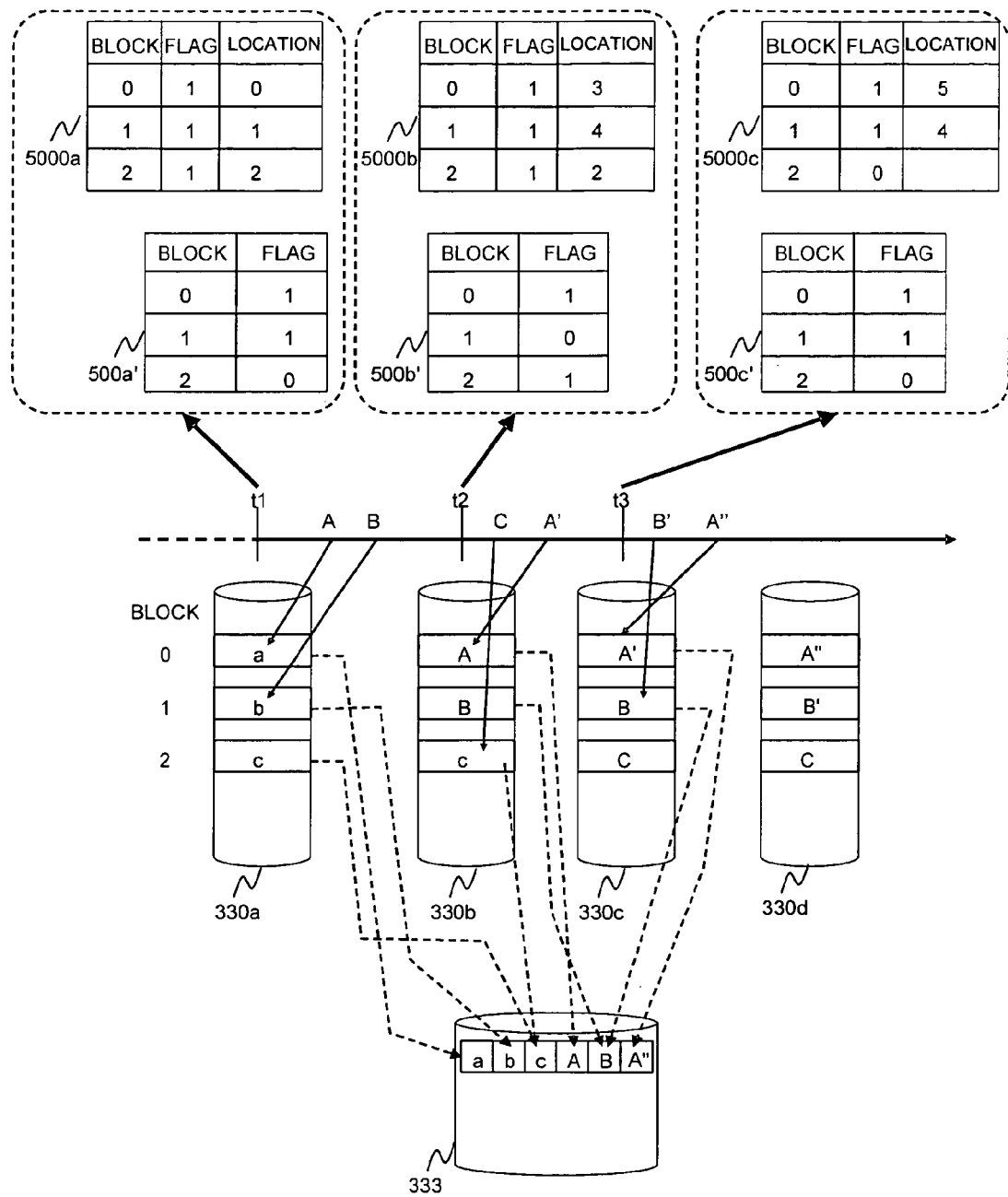
FIG. 17 shows another example of multiple snapshot processing.

FIG. 17 shows an example. At a time $t_1$, $t_2$, and $t_3$, suppose commands to perform snapshot processing of the logical volume (P-VOL) are issued. Element 330a, 330b, and 330c represent the virtual snapshot volume at time $t_1$, $t_2$, and $t_3$ that are created by the snapshot process 233, snapshot bitmap 5000a, 5000b, and 5000c (that are created and managed by the snapshot process 233) correspond to the virtual snapshot volume 330a, 330b, and 330c, respectively, and the I/O activity bitmaps 500a', 500b', and 500c' are prepared and managed by the I/O monitor 132. Element 333 represents the preservation volume. In this example, data block c is updated to data 'C' after the time $t_2$ (after the second virtual snapshot volume 330b is created). In this implementation, the old data block c is not duplicated and only single block is stored into the preservation volume 333. Instead, the LOCATION column of the snapshot bitmap 5000a and 5000b corresponding data block c (BLOCK number "2") points to the same location ("2") in the preservation volume 333. In this case, at the step 1004 in FIG. 8 of the I/O monitor process, only the FLAG in the bitmap 500b' corresponding to the second virtual volume 330b is updated, and the FLAG in the bitmap 500a' is not updated.

The blocks from P-VOL will continue to be stored to the preservation volumes until snapshot processing ceases. For example, if a user (e.g., administrator) deletes a snapshot generation, then of course data is no longer preserved for that generation and the corresponding bitmap is deleted.

In the embodiment described above, since the I/O monitor 132 simply observes the write I/O activity from the application program 212. The storage system 2 does not necessarily create snapshot volume(s) while the I/O monitor 132 is observing the write activities. After the I/O monitor 132 estimates the size of the preservation volume, users can prepare the preservation volume of the size in accordance with the estimation.

Of course, it is also possible that the observation is done while the storage system 2 is taking snapshots. If the capacity of the preservation volumes is much larger than the estimation, users can decrease the size of the preservation volume based on the estimated size.

$2^{ND}$ Embodiment

The system configuration of the information system according to a second embodiment of the present invention is the same as the one in the first embodiment. In the second embodiment, the estimate of the size of the preservation volume by I/O monitor 132 is performed differently. In the first embodiment, the I/O monitor 132 makes its observations in real time as the storage system 2 is taking snapshot. For example, when the storage system 2 takes snapshots as shown in FIG. 6, seven snapshots are taken from the volume in the first row in FIG. 6 (whose Port WWN 601 and LUN 602 is 10:04:e2:04:48:39 and 0 respectively) and each snapshot is taken every 24 hours. That is, it takes 24×7=168 hours to collect the seven snapshots, and the I/O monitor 132 must observe I/O activity for 168 hours. To reduce the observation time, the I/O monitor 132 in accordance with the second embodiment observes the write activities for a shorter length of time (like a couple of hours or within a day) and predicts (extrapolates) the size of snapshot data from the collected information.

Figure 9:
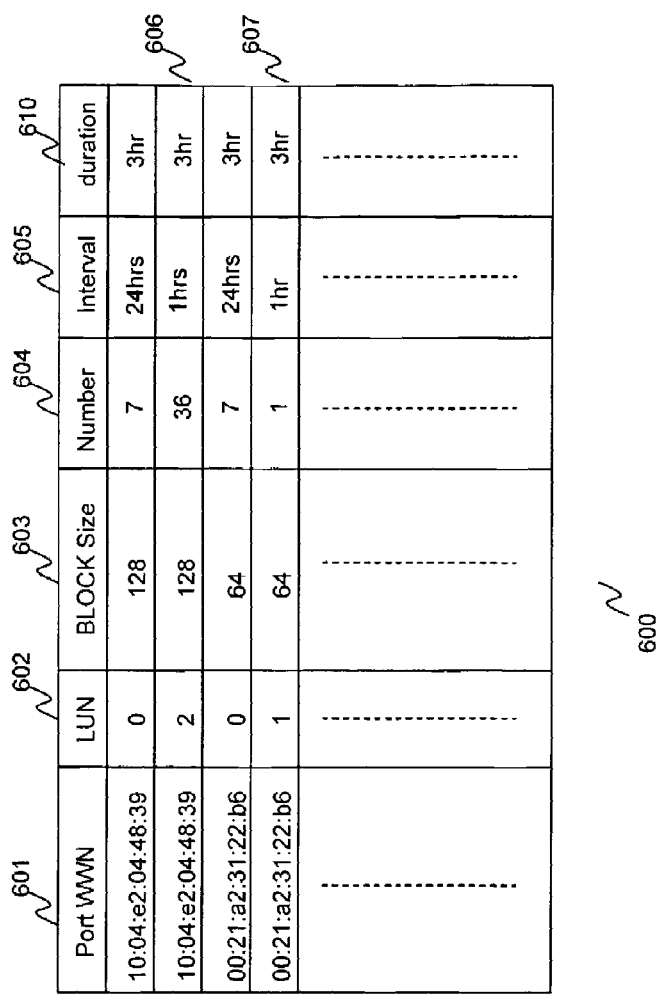
FIG. 9 shows user-settable information for a logical volume for another embodiment of the present invention.

FIG. 9 shows the input parameter information 600' that the I/O monitor 132 of the second embodiment uses. Most of the elements are the same as the input parameter information 600 in the $1^{st}$ embodiment. A Duration field 610 is included in information 600'. The Duration field 610 indicates the length of time that the I/O monitor 132 should observe the write activities. When the period of time has passed, the write observing process stops observing write activities even if the write activity observation in every snapshot generation is not finished. The I/O monitor 132 then performs some extrapolation or other similar processing to predict space requirements for storing snapshot data based on the collected information.

Figure 10:
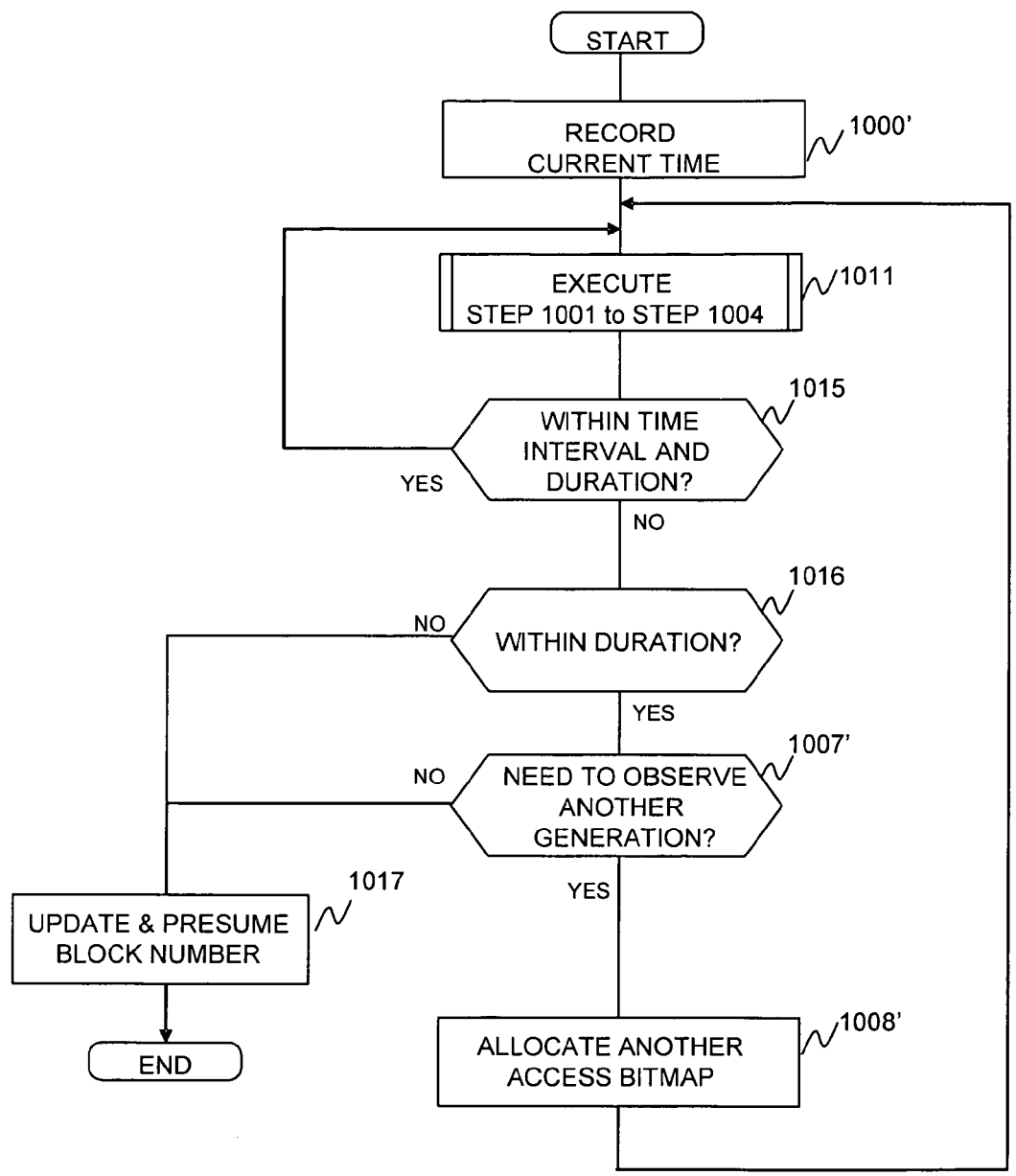
FIG. 10 shows a detailed process flow for the observing step shown in FIG. 7 according to another embodiment of the present invention.

FIG. 10 shows the process flow of the step 803 of the write observing process according to the $2^{nd}$ embodiment. Step 1000' is the same as the step 1000 in the $1^{st}$ embodiment (FIG. 8). Step 1011 represents steps 1001, 1002, 1003, and 1004 of FIG. 8.

In a Step 1015, the write observing process checks if the current time is within the time interval 605 by comparing the Time1 field 551. Also it checks if the time does not exceed the duration 610 since the write observing process started. If the current time is within the time interval 605 and within the duration 610, the process goes back to step 1011. If it is not, the process proceeds to step 1016. In a Step 1017, the write observing process updates the block number table 550 of the corresponding volume. If the write observing process does not observe the write activities in every snapshot generations, it presumes the number of differential data. Details of Step 1017 will be described later. In a Step 1016, if the time does not exceed the duration 610 since the write observing process started, the process proceeds to step 1007'. If the time passes the duration 610, the process ends. Steps 1007' and 1008' are the same as steps 1007 and 1008 respectively of FIG. 8.

In this $2^{nd}$ embodiment of the present invention, the write observing process predicts the size of the differential data. Two techniques are describe for making an estimate of the size of the differential data. However, it is understood that numerous other techniques are possible. Thus, in a first technique, when the duration 610 is 3 hours, the I/O monitor 132 must observe the write activity for three hours. FIG. 15 shows an example of the result of the observation. The write observing process makes the assumption that the same number of snapshot blocks is generated during each three hour period. In the case of FIG. 15, since 743 snapshot blocks are generated in a three hour periods, the write observing process predicts that 5944 snapshot blocks will be generated in a 24 hour period. And if the block number table 550 is associated with the volume whose Port WWN 601 and LUN 602 are 10:04:e2:04:48:39 and 2 respectively (e.g. the second row 606 in FIG. 6), since the write observing process must presume how much snapshot blocks is generated for 36 hours (because 36 snapshots should be made in each hour), it estimates the number of snapshot blocks that will be generated in 36 hours according to the following calculation:

$$5944/24 \times 36 = 8916.$$

Figures 11, 12:
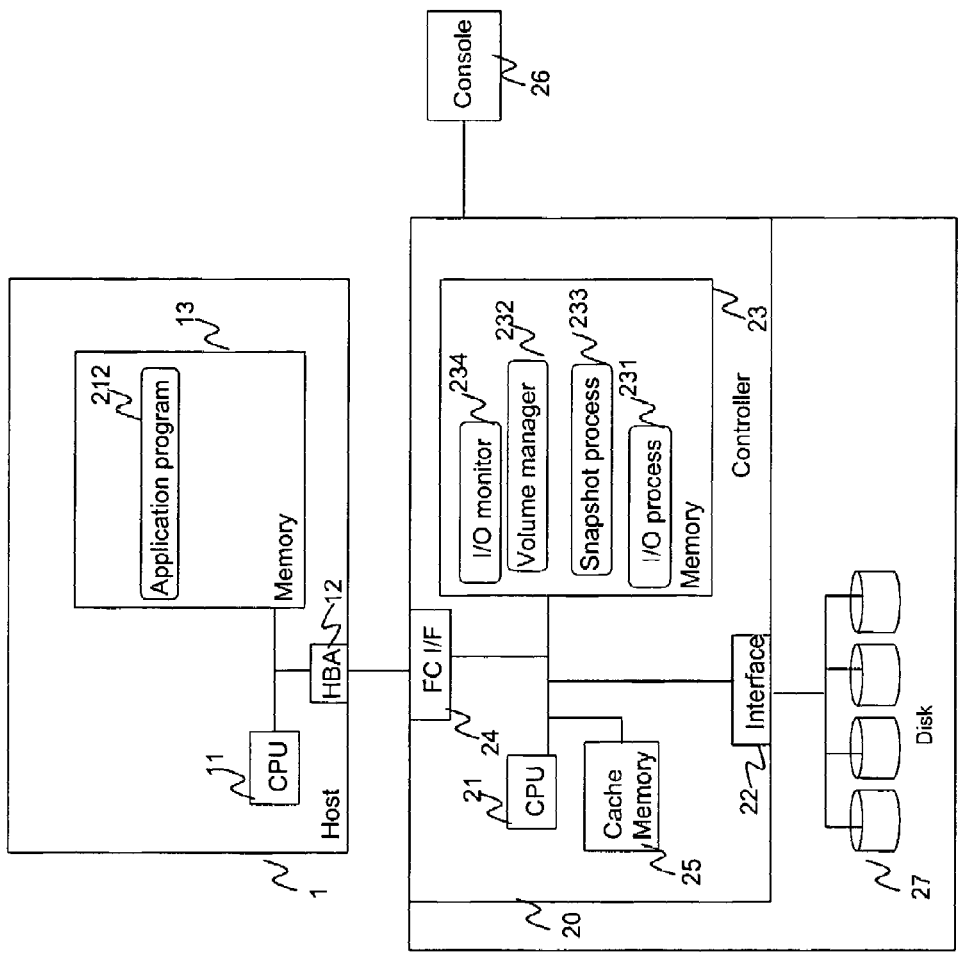
FIG. 11 shows a data table used for predicting storage usage information.
FIG. 12 shows a system configuration according to another embodiment of the present invention.

Another estimation technique can be used when a lot of write I/Os tend to come in a short period (for example, only during daytime) and users know the tendency, another method can be used. FIG. 11 shows an access tendency table 700 that the write observing process uses for this estimation technique. The table 700 can be prepared for each volume. A RATIO field 703 shows the ratio of the size of the differential data at a time specified between a Time1 field 701 and a Time2 field 702 to the size of the differential data between the time 0 o'clock (midnight) and 3 o'clock AM in a day. For example, in FIG. 1 the size of differential data that was generated between 9:00 and 12:00 is three times the size of the differential data from between 0:00 and 3:00.

For instance, if the I/O monitor 132 observes the write activity from 0:00 to 3:00 and the number of snapshot blocks generated during the period is 743 as in FIG. 15 (400 blocks were snapshot from 0AM–3AM, 200 blocks were snapshot from 1 AM–3AM, and 143 snapshots were taken from 2AM to 3AM), the estimated number of snapshot blocks that would be generated in another period such as from 6:00 to 9:00 is calculated by multiplying 2 by 743, since the RATIO field 703 during the time period of 6:00 to 9:00 is 2. By using the block number table 550 and the access tendency table 700 like above, the write observing process can estimates the number of snapshot blocks in a day.

Users can specify the RATIO field 703 between Time1 field 701 and Time2 field 702, and the period specified with Time1 field 701 and Time2 field 702 can be set freely by users. But typically, the period should be set to the same as the duration 610 of the volume.

$3^{RD}$ Embodiment

FIG. 12 shows the system configuration of the information system in accordance with a third embodiment of the present invention. The difference of the system in the third embodiment from the first or second embodiment is that the I/O monitor 234 executes in the storage system 2, whereas the I/O monitor 132 in the $1^{st}$ and $2^{nd}$ embodiment executes in the host computer 1. In this $3^{rd}$ embodiment, the task of observing write I/O activities is performed within the storage system 2.

The process of the I/O monitor 234 is almost the same as the one in the $1^{st}$ or $2^{nd}$ embodiment. However, at step 801 in FIG. 8, since the I/O monitor 234 and snapshot process 233 resides in the same disk controller 20, the I/O monitor 234 can acquire the input parameters, such as Port WWN 601, LUN 602, BLOCK Size 603, and so on, from the snapshot process 233 if the instructions to create snapshots has already come to the snapshot process 233 from users. In this case, users do not need to input these parameters manually. If no snapshots is made by the snapshot process 233, users needs to input these parameters manually since the snapshot process 233 does not have these parameter at this point in time.

What is claimed is:

1. A method for estimating storage capacity for maintaining a snapshot of a logical volume comprising:
analyzing a plurality of write requests during a period of time; and
for each of the write requests:
if a data block on the logical volume that is targeted by the write request is not identified as being marked, then identifying the data block as being marked;
accumulating the number of data blocks that are identified as being marked after the period of time has passed; and
presenting a rate of storage consumption for maintaining a snapshot of the logical volume based on the number of marked data blocks that have accumulated during the period of time.

2. The method of claim 1 further comprising displaying an alert message if storage consumption for maintaining a snapshot of the logical volume exceeds a predetermined level.

3. The method of claim 1 further comprising, at the end of the period of time, computing a predicted value indicative of storage consumption for maintaining a snapshot of the logical volume at a future time.

4. The method of claim 1 further comprising, if the data block on the logical volume that is targeted by the write request is not identified as being marked, then copying the data block to a preservation volume.

5. The method of claim 4 wherein data blocks on the logical volume that are not identified as being marked and data blocks stored on the preservation volume collectively constitute a snapshot of the logical volume.

6. The method of claim 1 further comprising receiving user-input indicative of the period of time.

7. A method for storing a snapshot of a logical volume comprising:
receiving a snapshot request to produce a snapshot of the logical volume;
receiving a write request at a time subsequent to receiving the snapshot request, the write request being associated with a first region of the logical volume to be written;
if the first region had been previously subject to a copy operation, then servicing the write request;
if the first region had not been previously subject to a copy operation, then performing steps of:
copying data in the first region to the preservation volume; and
subsequent to the copying, servicing the write request, wherein data in other regions of the logical volume which have not been previously copied to the preservation volume and data stored in the preservation volume collectively constitute a snapshot of the logical volume at the time of receiving the snapshot request;
computing a rate of storage consumption of the preservation volume resulting from copying of data from regions of the logical volume to the preservation volume during a predetermined period of time; and
presenting first information to a user indicative of the rate of storage consumption of the preservation volume.

8. The method of claim 7 further comprising receiving user-input indicative of the period of time.

9. The method of claim 7 further comprising displaying an alert message if storage consumption of the preservation volume exceeds a predetermined level.

10. The method of claim 7 further comprising, at the end of the predetermined period of time, computing a predicted value indicative of storage consumption for a future time.

11. The method of claim 7 wherein the presenting is performed in response to receiving a user inquiry for the first information.

12. The method of claim 7 wherein a host system issues write requests to the logical volume, wherein the computing includes performing a step in the host system of monitoring I/O activity of the host system.

13. The method of claim 7 wherein the logical volume is a component of a storage system, wherein the computing includes performing a step in the storage system of monitoring I/O activity received by the storage system.

14. A storage system comprising a controller and a plurality of physical storage devices operable by the controller, the controller having a computing device operable to:
receive a snapshot request to produce a snapshot of a logical volume;
receive a write request at a time subsequent to receiving the snapshot request, the write request being associated with a first region of the logical volume to be written;
if the first region had been previously subject to a copy operation, then service the write request;
if the first region had not been previously subject to a copy operation, then copy data in the first region to the preservation volume; and subsequent to the copying, service the write request, wherein data in other regions of the logical volume which have not been previously copied to the preservation volume and data stored in the preservation volume collectively constitute a snapshot of the logical volume at the time of receiving the snapshot request;
compute a rate of storage consumption of the preservation volume resulting from copying of data from regions of the logical volume to the preservation volume during a predetermined period of time; and
present first information to a user indicative of the rate of storage consumption of the preservation volume.

15. A method for a storage system configured with one or more logical volumes and operable to perform snapshot processing comprising:
receiving a plurality of first write requests directed to a logical volume;
servicing each first write request by writing data associated therewith to the logical volume;
receiving a snapshot request directed to the logical volume;
subsequent to receiving the snapshot request, receiving a plurality of second write requests directed to the logical volume;
for each second write request:
if a data block on the logical volume that is targeted by the second write request is not identified as being marked, then copying data stored in the data block to a preservation volume and identifying the data block as being marked; and
servicing the second write request by writing data associated therewith to the data block;
at a time t1 subsequent to receiving the snapshot request, determining how much storage has been consumed by the preservation volume and computing a rate of storage consumption of the preservation volume based thereon; and presenting first information to a user relating to storage consumption of the preservation volume.

16. The method of claim 15 further comprising displaying an alert when the storage consumed by the preservation volume rises above a predetermined value.

17. The method of claim 15 further comprising prior to the step of presenting, receiving a request for the first information, wherein the presenting is performed in response to the request for the first information, wherein the first information is the rate of storage consumption.

18. The method of claim 15 further comprising making a prediction as to how much storage will be consumed by the preservation volume at a time t2 subsequent to time t1 based on the rate of storage consumption determined at time t1.

19. The method of claim 15 wherein the step of copying is a step of copying two or more data blocks at a time from the logical volume to the preservation volume, wherein each of the two more data blocks is then identified as being marked.

20. The method of claim 15 wherein a host system issues the second write requests, wherein the step of determining is a step of monitoring I/O activity in the host system.

21. The method of claim 15 wherein the recited steps therein are performed with respect to a second logical volume, wherein the first information relates to storage consumption of the preservation volume as a result of storing data blocks from the logical volume and from the second logical volume.

22. A data storage system comprising:
a host subsystem;
a storage subsystem comprising a plurality of physical storage devices, the host system operative to send read requests and write requests to the storage system;
a first logical volume defined among the physical storage devices;
a preservation volume defined among the physical storage devices;
a computer operated process to determine storage utilization information of the preservation volume; and
a display component,
the storage subsystem operative to perform copy-on-write snapshot processing wherein a first data block of the first logical volume is copied to the preservation volume when a write request from the host subsystem targets the first data block, the first data block being copied to the preservation volume prior to servicing the write request, wherein additional write requests from the host subsystem causes additional data blocks of the first logical volume to be copied to the preservation volume prior to servicing the additional write requests,
the storage utilization information being determined based on the amount of storage consumed by the preservation volume over a predetermined period of time,
the storage utilization information being presented on the display component.

23. The system of claim 22 wherein the computer operated process is performed in the host subsystem.

24. The system of claim 22 wherein the computer operated process is performed in the storage subsystem.

25. The system of claim 22 wherein the storage utilization information includes a rate of storage consumption of the preservation volume.

26. The system of claim 22 wherein the storage utilization information includes a prediction of storage consumption at a point in time beyond the predetermined period of time.

* * * * *